(12) United States Patent
Hertz et al.

(10) Patent No.: US 6,362,861 B1
(45) Date of Patent: Mar. 26, 2002

(54) MICRODISPLAY SYSTEM

(75) Inventors: Pierre H. Hertz, Mountain View; Charles D. Hoke, Palo Alto; Ian Hardcastle, Sunnyvale, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/563,177

(22) Filed: May 2, 2000

(51) Int. Cl.7 .............................................. G02F 1/1335
(52) U.S. Cl. ........................... 349/69; 385/901; 362/89; 349/62
(58) Field of Search ............................. 349/62, 69, 70, 349/71, 57; 385/901; 362/84; 250/472.1, 483.1

(56) References Cited

U.S. PATENT DOCUMENTS

| | | | | |
|---|---|---|---|---|
| 4,243,302 A | * | 1/1981 | Hanner | ........................ 349/70 |
| 4,265,516 A | * | 5/1981 | Greubel et al. | ............. 349/103 |
| 4,799,050 A | * | 1/1989 | Prince et al. | ................. 349/71 |
| 4,884,860 A | * | 12/1989 | Brown | ........................ 385/27 |
| 5,144,463 A | * | 9/1992 | Hatano et al. | ............. 349/104 |
| 5,504,597 A | * | 4/1996 | Spraque et al. | ............... 349/57 |

* cited by examiner

*Primary Examiner*—Kenneth Parker

(57) ABSTRACT

A micro display system is provided that uses ambient light to illuminate the microdisplay. A wave-guide contains an embedded dye which absorbs ambient light through the surface of the wave-guide and re-emits light. Total internal reflection in the wave-guide and reflection from a reflector at one end of the wave-guide direct all the re-emitted light through a light-transmissive end to an illuminator for illuminating the microdisplay with polarized light. The microdisplay has a plurality of pixels which are activated to selectively reflect polarized or rotated polarized light back through the illuminator where the polarized light forms an image for a user.

30 Claims, 3 Drawing Sheets

MICRODISPLAY SYSTEM

TECHNICAL FIELD

The present invention relates generally to video and graphics microdisplay systems, and more particularly to a system for the illumination of microdisplays.

BACKGROUND OF THE INVENTION

The technology of using liquid crystal materials in microdisplays is relatively new. The liquid crystal material, which forms the optical component of the microdisplay, is placed directly on a silicon integrated circuit, or pixel array, under a transparent cover and the signals to turn the individual picture elements, or pixels, of the microdisplay on and off are generated on the silicon integrated circuit.

The term "microdisplay" is used since the display in a typical embodiment has an array of 1,024×768 pixels (the individual pixel size is approximately 12$\mu$) and the silicon die is about 1.3 cm×1 cm in area.

The microdisplay system works by having light from an ordinary light source pass through an illuminator, which converts non-polarized light from the ordinary light source into a polarized light beam. The polarized light beam is then directed onto the microdisplay. The microdisplay will reflect the light in a manner such that the plane of polarization of the light will or will not be rotated. The light then is reflected back to the illuminator which acts as an analyzer and causes the pixels to be bright or dark depending on whether the plane of polarization was rotated. The bright and dark pixels form a viewing image.

Applications for these microdisplays continue to expand. In one application, they are used for viewfinders for digital cameras and camcorders. In another, two microdisplays are fixed to a frame, such as eyeglasses, thereby giving a user a virtual image of a virtual computer screen, which is very lightweight and also very private.

Since microdisplays are small enough to be portable, batteries are used to provide power to illuminate the microdisplays. To minimize battery weight and maximize battery life, power consumption of the microdisplay must be minimized. High power consumption is one of the major problems with microdisplays. Attempts have been made in the art to use ambient light to illuminate microdisplays. However, the intensity of ambient light alone is generally insufficient to adequately illuminate microdisplays.

DISCLOSURE OF THE INVENTION

The present invention provides a micro display system that uses ambient light to illuminate the microdisplay. A wave-guide has a dye embedded therein which absorbs ambient light through the surfaces of the wave-guide and re-emits an augmented light, which is captured by the wave-guide. Total internal reflection in the wave-guide and reflection from a reflector at one end of the wave-guide direct substantially all the light through a light-transmissive end to an illuminator for illuminating the microdisplay. The microdisplay has a plurality of pixels which are activated to reflect light back through the illuminator for viewing the microdisplay image. This approach minimizes power usage and prolongs battery life that is particularly useful in portable microdisplay systems.

The present invention further provides a microdisplay system that uses ambient light to illuminate the microdisplay in color. A wave-guide has different dyes embedded in it which absorb ambient light and re-emit light in the three primary colors, namely red, green and blue. Total internal reflection in the wave-guide and reflection from a reflector at the end of the wave-guide direct the re-emitted light through the transmissive end into a solid-state color wheel. The solid-state color wheel is controlled by the integrated circuit to selectively permit the transmission of individual color lights to an illuminator for illuminating the microdisplay in synchronization with the activation of the pixels. The pixels are activated to reflect light back through the illuminator for viewing the microdisplay image.

The present invention further provides a microdisplay system that uses ambient light to illuminate the microdisplay in color. Three wave-guides have different dyes embedded in them which absorb ambient light and re-emit light in the three primary colors, namely red, green and blue. Total internal reflections in the wave-guide and reflections from reflectors at the ends of the wave-guides direct the re-emitted light through the transmissive ends into liquid crystal (LC) shutters. Each of the LC shutters is independently controlled to turn on or shut off the transmission of the respective color light through the respective LC shutters to a coupler which directs the light to an illuminator for illuminating the microdisplay. The microdisplay has a plurality of pixels which are activated to reflect light back through the illuminator for viewing the microdisplay image. This approach minimizes power usage and prolongs battery life that is particularly useful in portable microdisplay systems.

The present invention further provides a microdisplay system having an auxiliary, powered light source for use with the wave-guides for supplemental illumination of the microdisplay.

The above and additional advantages of the present invention will become apparent to those skilled in the art from a reading of the following detailed description when taken in conjunction with the accompanying drawings.

BEST MODE FOR CARRYING OUT THE INVENTION

Structure

Figure 1:
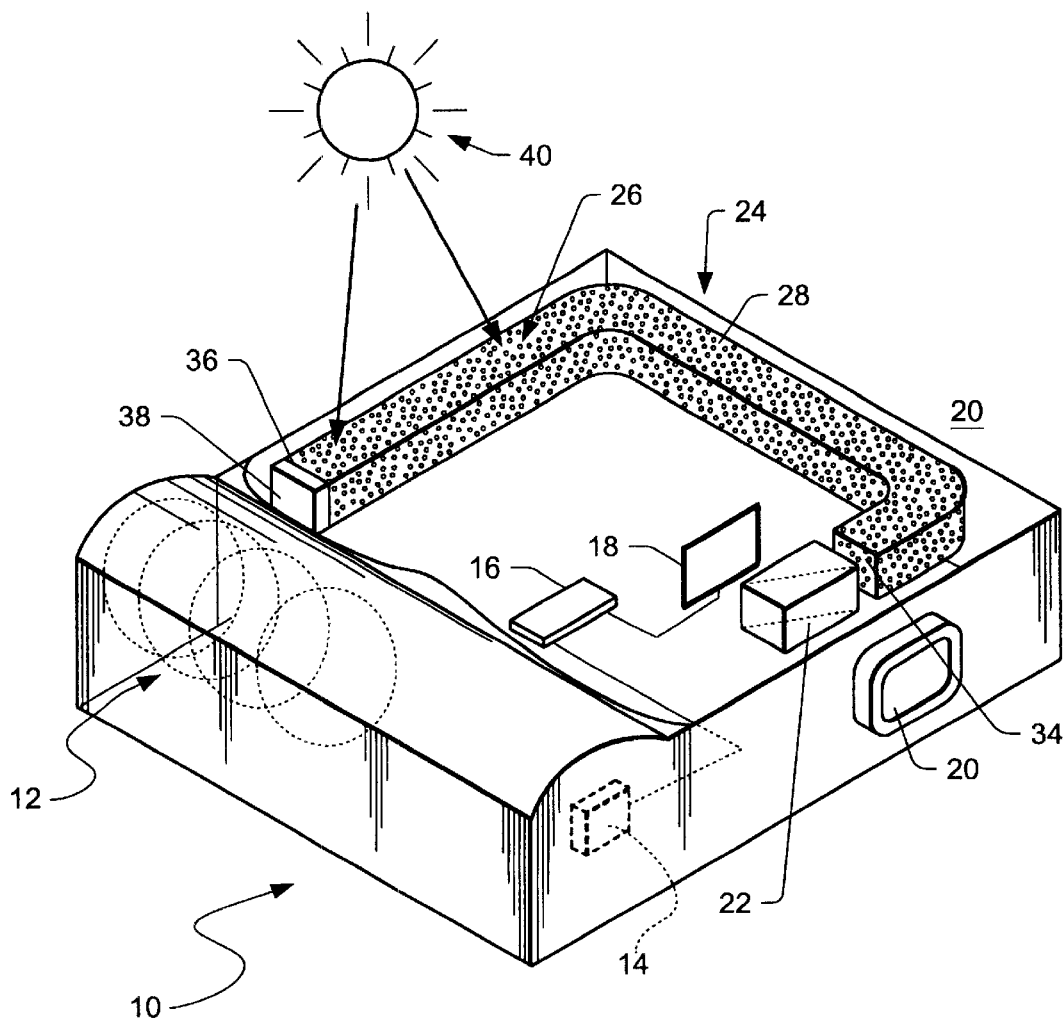
FIG. 1 is an isometric view of a camera incorporating the present invention.

Referring now to FIG. 1, therein is shown a typical use of the present invention in a digital camera 10. The camera 10 includes optics 12 and an image sensor such as a charge coupled device (CCD) 14. The CCD 14 sends a digitized image to an integrated circuit 16, which controls a microdisplay 18.

The microdisplay 18 contains a liquid crystal material, which is placed directly on a silicon integrated circuit having an array of individual picture elements, or pixels. The typical array has an array of 1,024×768 pixels (the individual pixel size is approximately 12μ) and the silicon die is about 1.3 cm×1 cm in area. The liquid crystal responds to signals generated on the silicon integrated circuit under the control of the integrated circuit 16 to activate the pixels so as to change the plane of polarization of the light directed at the microdisplay 18 to match the image falling on the CCD 14.

The microdisplay 18 is illuminated by polarized light passing through a light beam-splitter, or an illuminator 22, which is a polarizer which converts ordinary, non-polarized light into polarized light. Ordinary light is provided to one side of the illuminator 22 and is reflected out at right angles onto the microdisplay 18. The microdisplay 18 will reflect the light back in a manner such that the plane of polarization of the reflected light will or will not be rotated. The reflected light then is reflected back to the illuminator 22 which acts as an analyzer and makes the pixels appear to be reflective or non-reflective (dark) depending on whether the plane of polarization of the polarized light was rotated.

A user sees the image on the microdisplay 18 through the illuminator 22 and an eyepiece or a viewfinder 20. When viewed by the user at the viewfinder 20, the reflective and dark pixels form the viewing image with the reflective pixels providing light of the color of the polarized light.

In the embodiment of FIG. 1 of the present invention, the non-polarized light is provided by a wave-guide 24. The wave-guide 24 is of an optical material such as glass or plastic with or without a low index of refraction sheathing, containing a conventional light-responsive dye 26, which absorbs light at a broad set of frequencies and emits the light energy at another, narrower set of frequencies. It is formed with a top, bottom, and side surfaces 28, a light-transmissive front end 34, and a back end 36 having a reflective device 38, such as mirroring.

In the camera 10, the wave-guide 24 has its surfaces 28 exposed to an ordinary light from an ambient light source 40 and is shaped to direct the majority of light falling on the surfaces 28 to the light-transmissive front end 34.

Figure 2:
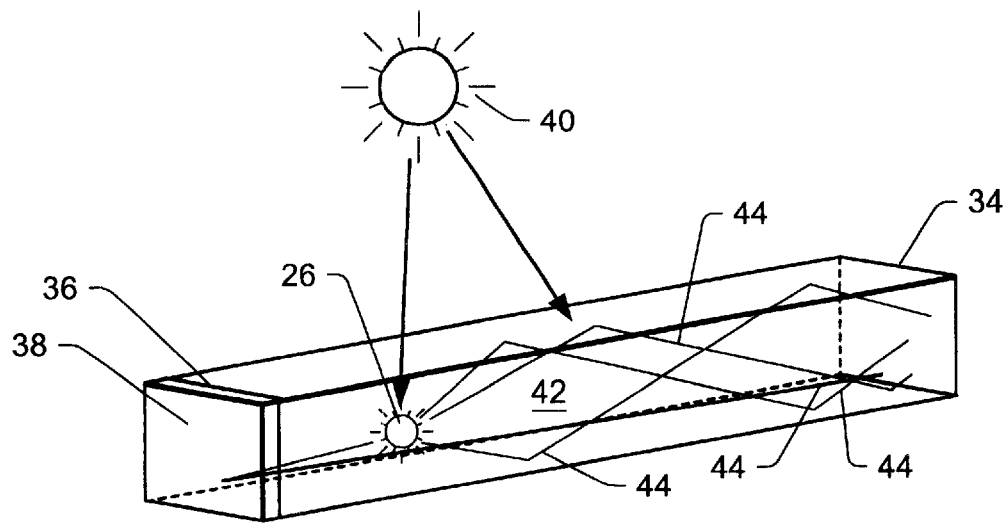
FIG. 2 is an isometric view with a partial cut-away of a single color microdisplay system of the present invention.

Referring now to FIG. 2, therein is shown a wave-guide 42 which shows the basic principle of operation of the wave-guides of the present invention. The same elements as in FIG. 1 are shown with the same number. For purposes of illustration, the wave-guide 42 is shown straight, but it would be understood that it might be in any configuration required to fit in the microdevice using system in which it is used. For example, the wave-guide 42 could be configured to form the wave-guide 24 of FIG. 1.

There are a multitude of molecules of the dye 26 embedded in the wave-guide 42, but also for purposes of illustration in FIG. 2, only one molecule of dye 26 is shown. The one molecule of dye 26 absorbs light from the ambient light source 40 and re-emits it as re-emitted light 44 in all directions. Most of the re-emitted light 44 is trapped inside the wave-guide 42 by reflection from the material-air boundary or a refractive sheathing. The re-emitted light 44 re-emitted towards the back end 36 is reflected by the reflective device 38 forward through the light-transmissive front end 34 of the wave-guide 42.

To provide more uniform light transmission, the light-transmissive front end 34 may be roughened as an option to produce a diffuse source for the illuminator 22.

Figure 3:
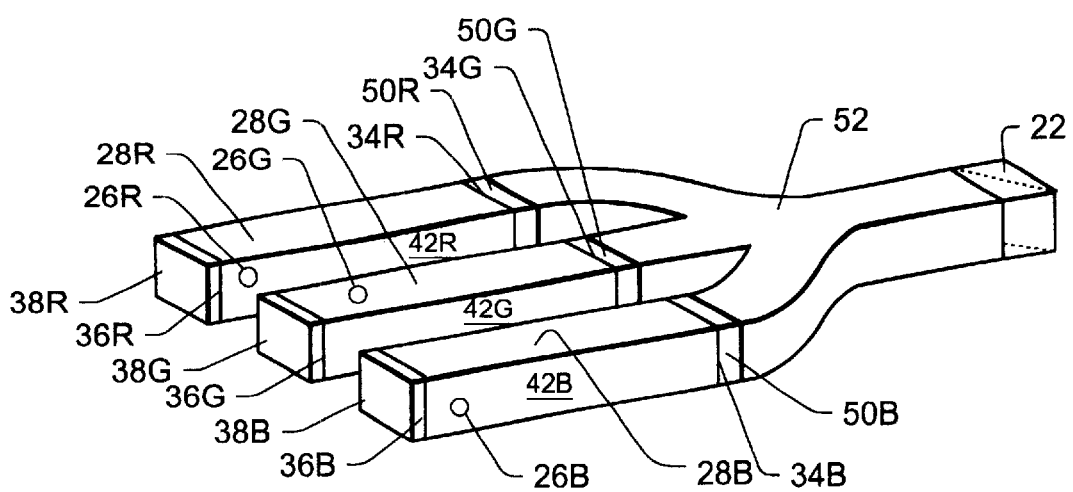
FIG. 3 is an isometric view of a multi-color microdisplay system of an alternate embodiment of the present invention.

Referring now to FIG. 3, therein is shown wave-guides 42R, 42G and 42B of the present invention with the same elements as in FIG. 1 shown with the same number. A wave-guide 42R has surfaces 28R, a light-transmissive front-end 34R, a back end 36R with a reflective device 38R, and a dye 26R embedded therein. The wave-guide 42G has surfaces 28G, a light-transmissive front end 34G, a back end 36G with a reflective device 38G, and a dye 26G embedded therein. Similarly, The wave-guide 42B has surfaces 28B, a light-transmissive front-end 34B, a back end 36B with a reflective device 38B, and a dye 26G embedded therein. In this embodiment, the dyes 26R, 26G, and 26B collect ambient light through the respective surfaces 28R, 28G, and 28B and re-emit light of red (R), green (G), and blue (B) color, respectively. It would be evident to those skilled in the art that other color combinations may be used with fewer or greater numbers of colors depending upon the application.

At the light-transmissive front ends 34R, 34G, and 34B are respective light shutters or, liquid crystal (LC) shutters 50R, 50G, and 50B. The LC shutters 50R, 50G, and 50B are responsive to electrical signals to allow or prevent the respective transmission of re-emitted red, green, and blue light therethrough. On the other side of the LC shutters 50R, 50G, and 50B is a coupler 52.

The coupler 52 is a wave-guide of an optical material such as glass or plastic with or without a low index of refraction sheathing. The coupler 52 directs one of the colored lights, depending on which of the LC shutters is allowing the transmission of light, to the illuminator 22. For example, when the LC shutter 50R is on, red light re-emitted through wave-guide 42R is allowed to transmit to the coupler 52. When the LC shutter 50R is off, light re-emitted through wave-guide 42R is not allowed to transmit to the coupler 52. The LC shutters 50R, 50G, and 50B are controlled by the integrated circuit 16 to operate in conjunction with the microdisplay 18.

Figure 4:
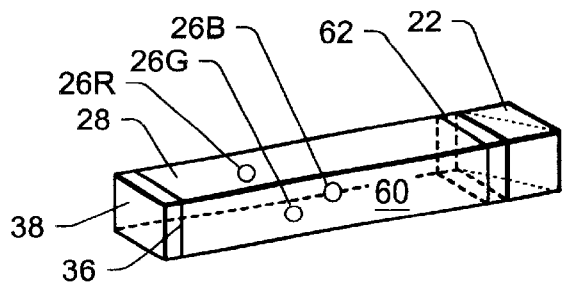
FIG. 4 is an isometric view of an alternate embodiment of a multi-color microdisplay system of the present invention.

Referring now to FIG. 4, therein is shown a wave-guide 60 which incorporates all three dyes 26R, 26G, and 26B. For convenience of illustration, the same elements as in FIG. 1 are shown with the same number. The wave-guide 60 includes the surfaces 28, the light-transmissive front end 34, and the back end 36 with the reflective device 38. In this embodiment, the dyes 26R, 26G, and 26B absorb ambient light from the surfaces 28 and re-emit light of red, green and blue color, respectively, which combine as white light. The wave-guide 60 provides the white light to a conventional solid-state color wheel 62 positioned at the light-transmissive front end 34 for selectively allowing the transmission of the red, blue, and green colored light to the illuminator 22. The color wheel 62 is controlled by the integrated circuit 16 to operate in synchronization with the microdisplay 18.

Using the same wave-guide 60, the white light could be used to illuminate a display in which the pixels are colored.

Figure 5:
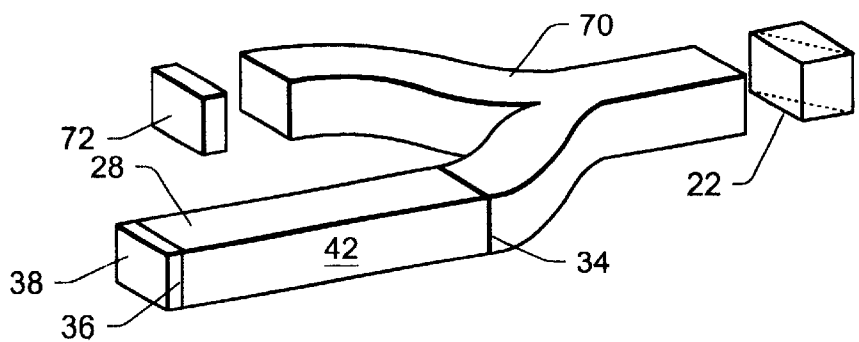
FIG. 5 is an isometric view of an alternate embodiment of a microdisplay system of the present invention with auxiliary powered light source.

Referring now to FIG. 5, therein is shown the wave-guide 42 of FIG. 2 optically connected to one branch of a two-branch coupler 70. The coupler 70 is a glass or plastic wave-guide which has its other branch optically connected to an auxiliary powered light source 72. The light source 72 is capable of providing supplemental or replacement light to the wave-guide 42 which can be transmitted through the light-transmissive front end 34 to the illuminator 22. In one embodiment, the light source 72 is a light emitting diode (LED).

Figure 6:
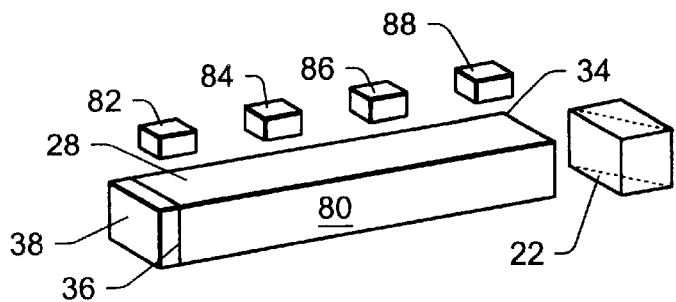
FIG. 6 is a schematic of an alternate embodiment of a microdisplay system of the present invention with another auxiliary powered light source.

Referring now to FIG. 6, therein is shown a wave-guide 80 with a number of auxiliary light sources 82, 84, 86, and 88 positioned adjacent to its surfaces 28. For convenience of illustration, the same elements as in FIG. 1 are shown with the same number. The light sources 82, 84, 86, and 88 can augment the ambient light collected by the dye (not shown)

and increase the intensity of the light re-emitted through the light-transmissive front end 34 of the wave-guide 80. Also, the light sources 82, 84, 86, and 88 can be of different colors to augment the light provided to specific red, green, blue and white dyes (not shown) in the wave-guide 80. Again, in one embodiment, the light sources 82, 84, 86, and 88 are formed of LEDs.

Figure 7:
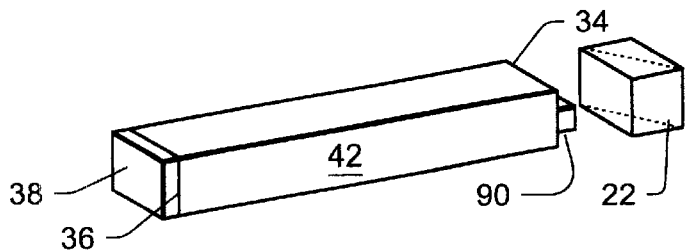
FIG. 7 is a schematic of an alternate embodiment of a microdisplay system of the present invention with a further auxiliary powered light source.

Referring now to FIG. 7, therein is shown the wave-guide 42 with an auxiliary light source 90 positioned at the light-transmissive front end 34 of the wave-guide 42. The light source 90 may be formed in the path of the light of the wave-guide 42. For convenience of illustration, the same elements as in FIG. 1 are shown with the same number. The light source 90 may be transparent, such as a transparent LED or very thin so that it does not impede light to the illuminator 22. Again, in one embodiment, the light source 90 is formed of an LED. In a further embodiment, the light source 90 is formed integral with or inside the wave-guide 42.

Operation

In operation of the FIG. 1 and FIG. 2 embodiment, the light from the ambient light source 40 is collected through the surfaces 28 of the wave-guide 24 or 42 by the dye 26 embedded therein. The ambient light is re-emitted by the dye 26 as the re-emitted light 44 which is refracted within the wave-guide 24 or 42 and reflected by the reflective device 38 and directed out the light-transmissive front end 34.

Since most of the light that is re-emitted is trapped by the wave-guide 24 or 42, the re-emitted light 44 that comes out at the light-transmissive front end 34 is sufficient to illuminate the microdisplay 18. By augmenting the ambient light with the use of the wave-guide 24 or 42 with the embedded dye 26, the problem associated with insufficient ambient light is solved.

For color microdisplays, the FIG. 3 embodiment will provide light with the three primary colors, RGB, from the three wave-guides, 42R, 42G and 42B. In this embodiment, the dyes 26R, 26G, and 26B collect ambient light and re-emit light of red, green and blue color, respectively. The LC shutters 50R, 50G, and 50B sequentially direct colored light into the coupler 52 where the colored light is directed into the illuminator 22. In the camera 10, the colored light is polarized by the illuminator 22 and directed to the microdisplay 18 where selected pixels would be activated where a particular color is desired. The plane of polarization of the particular color would not be rotated when be reflected back through the illuminator 22 so it would be transmitted to the viewfinder 20 for the user. By using a fast refresh rate, the user would view a full color image through the viewfinder 20.

Alternatively as shown in FIG. 4, the three dyes 26R, 26G, and 26B may be mixed in the single wave-guide 60. In this embodiment, the dyes 26R, 26G, and 26B collect ambient light and re-emit light of red, green and blue color, respectively. The solid-state color wheel 62 selectively allows transmission of the red, green, and blue color light to the illuminator 22. As described above, in the camera 10, the colored light is polarized by the illuminator 22 and directed to the microdisplay 18 where selected pixels would be activated where a particular color is desired. The plane of polarization of the particular color would not be rotated when be reflected back through the illuminator 22 so it would be transmitted to the viewfinder 20 for the user. Again, by using a fast refresh rate, the user would view a full color image through the viewfinder 20.

Where low light conditions occur, the auxiliary powered light source 72 as shown in FIG. 5 is provided in addition to the wave-guide 42. The auxiliary powered light source 72 is used to illuminate the microdisplay 18 in low lighting conditions or to augment the ambient light when required.

Since the illuminator 22 is a beam splitter, the auxiliary powered light source 72 could also be adjacent to it without the coupler 70, but it would have to be positioned on the same side of the illuminator 22 as the wave-guide 42.

In the FIG. 6 embodiment, the colored or white light sources 82, 84, 86, and 88 augment the ambient light collected by the dye or dyes and increase the light re-emitted from the wave-guide 80. For colored light, the color wheel of FIG. 5 would be required, but for white light, the system of FIG. 6 would be sufficient.

In the FIG. 7 embodiment, the auxiliary powered light source 90 is positioned at the light-transmissive front end 34 of the wave-guide 42 along the path of the light of the wave-guide 42 to supplement the ambient light. Its operation will be evident from the above descriptions of other embodiments.

As would be evident to those skilled in the art, the illuminator 22 is positioned between the microdisplay 18 and the viewfinder 20 because the microdisplay 18 is of a reflective type. If the microdisplay 18 were of a transmissive type where light is either allowed or prevented from passing through the liquid crystal therein, the microdisplay 18 is disposed just between the illuminator 22 and the viewfinder 20.

While the present invention has been described in conjunction with a specific best mode, it is to be understood that many alternatives, modifications, and variations will be apparent to those skilled in the art in light of the afore going description. For example, rather than a wave-guide with rectangular cross-section, wave-guides with other shape and form, such as circular or oval cross-sections, could be substituted. Accordingly, it is intended to embrace all such alternatives, modifications, and variations which fall within the scope of the included claims. All matters set forth herein or shown in the accompanying drawings are to be interpreted in an illustrative and non-limiting sense.

The invention claimed is:

1. A microdisplay system using ambient light comprising:

a microdisplay;

a first wave-guide having a light receiving surface, a light-transmissive first front end, and a first back end, the first wave-guide having a first reflective device provided at the first back end, the first wave-guide having a first dye embedded therein, the first dye absorbing the ambient light through the light receiving surface to re-emit light, the first wave-guide trapping the re-emitted light and directing the re-emitted light through the light-transmissive first front end; and an illuminator optically coupled to the light-transmissive first front end of the first wave-guide for receiving the re-emitted light and illuminating the microdisplay with the re-emitted light.

2. The microdisplay system as claimed in claim 1 wherein:

the light-transmissive first front end has a roughened surface provided thereon.

3. The microdisplay system as claimed in claim 1 including:

an eyepiece for viewing the microdisplay; and wherein:
the illuminator is disposed between the microdisplay and the eyepiece.

4. The microdisplay system as claimed in claim 1 including:
an eyepiece for viewing the microdisplay; and wherein:
the microdisplay is disposed between the illuminator and the eyepiece.

5. The microdisplay system as claimed in claim 1 wherein:
the first wave-guide has a second dye and a third dye additionally embedded therein, the first dye absorbing the ambient light to re-emit light with a first color, the second dye absorbing the ambient light to re-emit light with a second color, and the third dye absorbing the ambient light to re-emit light with a third color.

6. The microdisplay system as claimed in claim 5 including:
a color wheel positioned between the first wave-guide and the illuminator for selectively providing the re-emitted light with the first, second, and third colors to the illuminator.

7. The microdisplay system as claimed in claim 6 wherein:
the first color, the color and the third color are red, green and blue, respectively.

8. The microdisplay system as claimed in claim 1 wherein:
the first dye absorbs the ambient light to re-emit light with a first color; and including:
a second wave-guide having a second light receiving surface, a light-transmissive second front end, a second back end, the second wave-guide having a second reflective device provided at the second back end, the second wave-guide having a second dye embedded therein, the second dye absorbing the ambient light to re-emit light with a second color;
a third wave-guide having a third light receiving surface, a light-transmissive third front end, a third back end, the third wave-guide having a third reflective device provided at the third back end, and the third wave-guide having a third dye embedded therein, the third dye absorbing the ambient light to re-emit light with a third color; and wherein:
the illuminator is optically coupled to the light-transmissive second front end of the second wave-guide and the light-transmissive third front end of the third wave-guide.

9. The microdisplay system as claimed in claim 8 including:
a first light shutter at the light-transmissive first front end of the first wave-guide for selectively providing the first color light to the illuminator;
a second light shutter at the light-transmissive second front end of the second wave-guide for selectively providing the second color light to the illuminator; and
a third light shutter coupled to the third back end the third wave-guide for selectively providing the third color light to the illuminator.

10. The microdisplay system as claimed in claim 9 including:
a wave-guide coupler coupled to the light-transmissive first, second, and third front ends of the respective first, second, and third wave-guides, the coupler positioned between the first, second, and third light shutters and the illuminator.

11. The microdisplay system as claimed in claim 1 including:
an auxiliary powered light source operatively positioned to illuminate the illuminator.

12. The microdisplay system as claimed in claim 11 including:
a wave-guide coupler having two branches, one of the two branches connected to the first wave-guide and the other of the two branches connected to the auxiliary powered light source, the wave-guide coupler operatively positioned to illuminate the illuminator from the first wave-guide and the auxiliary powered light source.

13. The microdisplay system as claimed in claim 11 wherein:
the auxiliary powered light source is positioned adjacent the first wave-guide.

14. The microdisplay system as claimed in claim 11 wherein:
the auxiliary powered light source is positioned inside the first wave-guide.

15. The microdisplay system as claimed in claim 11 wherein:
the auxiliary powered light source is transparent and positioned between the first wave-guide and the illuminator.

16. A microdisplay system using ambient light comprising:
a liquid crystal microdisplay having a plurality of pixels selectively which can be actuated to reflect polarized light with the plane of polarization rotated;
a first wave-guide having a light receiving surface, a light-transmissive first front end, and a first back end, the first wave-guide having a first reflective device provided at the first back end, the first wave-guide having a first dye embedded therein, the first dye absorbing the ambient light through the light receiving surface to re-emit light at a first color, the first wave-guide trapping the re-emitted light and directing the re-emitted light through the light transmissive first front end; and
an illuminator optically coupled to the first of the first wave-guide for receiving the re-emitted light, polarizing the re-emitted light, and illuminating the microdisplay with the polarized light, the illuminator receiving and transmitting polarized light to the microdisplay.

17. The microdisplay system as claimed in claim 16 wherein:
the light-transmissive first front end has a roughened surface provided thereon for diffusing light trapped in sand released from the first wave-guide.

18. The microdisplay system as claimed in claim 16 including:
an eyepiece for viewing the microdisplay; and wherein:
the microdisplay is a reflective microdisplay; and
the illuminator is disposed between the microdisplay and the eyepiece for providing polarized light to the eyepiece.

19. The microdisplay system as claimed in claim 16 including:
a eyepiece for viewing the microdisplay; and wherein:
the microdisplay is a transmissive microdisplay; and
the microdisplay is disposed between the illuminator and the eyepiece for selectively transmitting light from the illuminator to the eyepiece.

20. The microdisplay system as claimed in claim 16 wherein:
the first wave-guide has a second dye and a third dye additionally embedded therein, the first dye absorbing the ambient light to re-emit light with a first color, the second dye absorbing the ambient light to re-emit light with a second color, and the third dye absorbing the ambient light to re-emit light with a third color.

21. The microdisplay system as claimed in claim 20 including:
a solid-state color wheel positioned between the first wave-guide and the illuminator for selectively providing the light with the first, second, and third colors to the illuminator, the color wheel operatively coupled to the microdisplay.

22. The microdisplay system as claimed in claim 21 wherein:
the first color, the color and the third color are red, green and blue, respectively.

23. The microdisplay system as claimed in claim 16 wherein:
the first dye absorbs the ambient light to re-emit light with a first color; and including:
a second wave-guide having a second light receiving surface, a light-transmissive second front end, a second back end, the second wave-guide having a second reflective device provided at the second back end, the second wave-guide having a second dye embedded therein, the second dye absorbing the ambient light to re-emit light with a second color;
a third wave-guide having a third light receiving surface, a light-transmissive third front end, a third back end, the third wave-guide having a third reflective device provided at the third back end, and the third wave-guide having a third dye embedded therein, the third dye absorbing the ambient light to re-emit light with a third color; and wherein:
the illuminator is optically coupled to the light-transmissive second front end of the second wave-guide and the light-transmissive third front end of the third wave-guide to receive non-polarized light from the illuminator and provide polarized light to the microdisplay.

24. The microdisplay system as claimed in claim 23 including:
a first liquid crystal shutter at the light-transmissive first front end of the first wave-guide for selectively providing the first color light to the illuminator;
a second liquid crystal shutter at the light-transmissive second front end of the second wave-guide for selectively providing the second color light to the illuminator; and
a third liquid crystal shutter coupled to the third back end the third wave-guide for selectively providing the third color light to the illuminator; and
the first, second, and third liquid crystal shutters operatively coupled to the microdisplay.

25. The microdisplay system as claimed in claim 24 including:
a wave-guide coupler coupled to the light-transmissive first, second, and third front ends of the respective first, second, and third wave-guides, the coupler positioned between the first, second, and third light shutters and the illuminator to provide non-polarized light to the illuminator.

26. The microdisplay system as claimed in claim 16 including:
a light emitting diode operatively positioned to illuminate the illuminator.

27. The microdisplay system as claimed in claim 26 including:
a wave-guide coupler having two branches, one of the two branches connected to the first wave-guide and the other of the two branches connected to the auxiliary powered light source, the wave-guide coupler operatively positioned to illuminate the illuminator from the first wave-guide and the auxiliary powered light source.

28. The microdisplay system as claimed in claim 26 wherein:
the light emitting diode is positioned along the light receiving surface.

29. The microdisplay system as claimed in claim 26 wherein:
the light emitting diode is positioned inside the first wave-guide.

30. The microdisplay system as claimed in claim 26 wherein:
the light emitting diode is transparent and positioned between the first wave-guide and the illuminator.

* * * * *